UNITED STATES PATENT OFFICE.

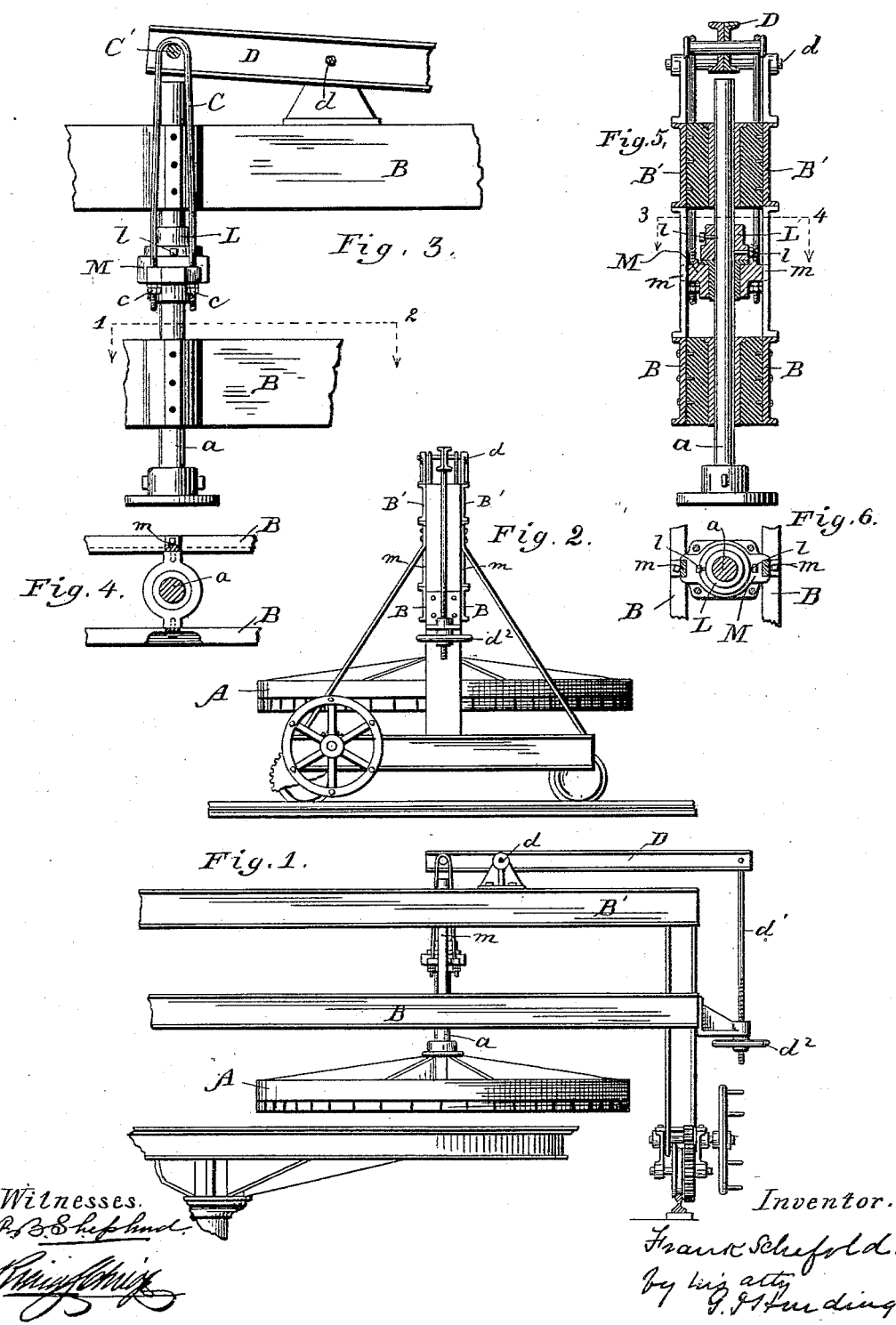

FRANK SCHEFOLD, OF NEW ALBANY, INDIANA, ASSIGNOR TO N. T. DE PAUW, OF SAME PLACE.

MACHINE FOR GRINDING, SMOOTHING, AND POLISHING GLASS.

SPECIFICATION forming part of Letters Patent No. 384,394, dated June 12, 1888.

Application filed December 23, 1887. Serial No. 258,807. (No model.)

*To all whom it may concern:*

Be it known that I, FRANK SCHEFOLD, of New Albany, county of Floyd, and State of Indiana, have invented a new and useful Improvement in Machines for Grinding, Smoothing, and Polishing Glass, of which the following is a specification.

My invention relates specifically to mechanism by means of which the runners or upper grinding, smoothing, or polishing surfaces can be lowered upon the glass upon the table gradually, and also that the runners may be elevated off the surface of the glass when it is desired so to do for any purpose.

In the drawings, Figure 1 shows an elevation of table and one of the runners, and illustrates the mechanism by means of which the runners are elevated off the table, &c. Fig. 2 shows an end view of Fig. 1. Fig. 3 represents a view of shaft which supports the runners and by which they are revolved; Fig. 4, a section on lines 1 2, Fig. 3; Fig. 5, a vertical section of Fig. 3; Fig. 6, a section on lines 3 4, Fig. 5.

Similar letters denote similar parts throughout the drawings.

A represents the runners, which are attached to the shaft $a$. There may be any number of runners, only one being shown, as an increased number would be a duplication of the one illustrated and described.

F represents the table upon which the sheet of glass is placed, and this table is caused to revolve by any well-known means. The shaft $a$ passes through the cross-head M. (Shown in Figs. 3, 5, and 6.) This cross-head is kept in position by the guides $m\ m$. Above and resting on this upper portion of the cross-head is the collar L, which collar is secured to the shaft by the pins $l$, and when the shaft revolves the collar L revolves on the upper surface of the cross-head.

An elongated U-shaped link, C, is secured at its two lower ends to the cross-head at $c\ c$, and its upper curved surface surrounds a pin, C′, placed in the lever D, said lever being fulcrumed at $d$, the fulcrum being sustained by the strong lateral beam B′, by which, with the lateral beam B and cross-bracing, the runners are sustained. The outer end of this lever-arm D is connected with the rod threaded at its lower end, and on which threaded end a threaded wheel, $d^2$, works, said wheel $d^2$ being connected with the lower beam, B.

The operation is as follows: By turning the hand-wheel the rod $d′$ is lengthened or shortened and the lever-arm D elevated or depressed. If it be depressed, it allows the cross-head M, to which it is connected by the link C, to fall downward upon the ways $m\ m$, and the collar and shaft to which it is connected follow the cross-head downward. The reverse action of the handle elevates the cross-head and the collar and shaft to which it is connected any desired distance.

Having now fully described my invention, what I claim, and desire to protect by Letters Patent, is—

1. In combination, a runner, a shaft connected to said runner, a cross-head within which said shaft revolves, a collar surrounding said shaft and normally resting upon the upper surface of said cross-head, a lever, and a link connecting said lever and the cross-head, whereby when said lever is operated the shaft and its runner are elevated or depressed.

2. In combination, a runner, a shaft connected to said runner, a cross-head within which said shaft revolves, a collar normally resting upon the upper surface of said cross-head, a lever, a link connecting the said lever and the cross-head, and a rod threaded at its lower end attached to the outer end of said lever, and a threaded wheel through which the lower end of said rod passes, whereby when the said wheel is revolved the shaft and its runner are elevated or depressed.

3. In combination, a runner, a shaft connected to said runner, a cross-head within which said shaft revolves, ways upon which said cross head travels, a collar normally resting upon the upper surface of said cross-head, a lever-arm, a U-shaped link connecting said lever and the cross-head, and a rod threaded at its lower end attached to the outer end of said lever, and a threaded wheel through which the lower end of said rod passes, whereby when said wheel is revolved the shaft and its runner are elevated or depressed.

FRANK SCHEFOLD.

Witnesses:
RICHD. S. CHILD, Jr.,
HOWARD QUICK.